United States Patent [19]

Iwami

[11] Patent Number: 4,565,344
[45] Date of Patent: Jan. 21, 1986

[54] SEAT ADJUSTMENT DEVICE FOR A VEHICLE SEAT

[75] Inventor: Masahide Iwami, Akishima, Japan

[73] Assignee: Tachikawa Spring Co. Ltd., Japan

[21] Appl. No.: 558,532

[22] Filed: Dec. 6, 1983

[51] Int. Cl.$^4$ ............................................. F16M 13/00
[52] U.S. Cl. .................................. 248/429; 296/65 R; 297/341
[58] Field of Search ............... 248/429, 424, 430, 244, 248/245, 246; 297/341, 317; 108/143; 296/65 R

[56] References Cited

U.S. PATENT DOCUMENTS

| | | | |
|---|---|---|---|
| 1,299,234 | 4/1919 | Russell | 248/244 |
| 1,969,353 | 8/1934 | Chapman | 248/429 |
| 3,489,291 | 1/1970 | Frazier | 248/245 |
| 3,524,677 | 8/1970 | Louton | 248/430 |
| 3,922,029 | 11/1975 | Urai | 248/429 |
| 4,089,500 | 5/1978 | Gustafsson | 248/429 |
| 4,183,493 | 1/1980 | Koutsky | 248/430 |
| 4,209,159 | 6/1980 | Becker et al. | 248/430 |
| 4,281,871 | 8/1981 | Grittner et al. | 248/429 |
| 4,291,856 | 9/1981 | Urai | 248/429 |
| 4,378,101 | 3/1983 | Kazaoka et al. | 248/429 |

Primary Examiner—Ramon S. Britts
Assistant Examiner—Ramon O. Ramirez
Attorney, Agent, or Firm—Cushman, Darby & Cushman

[57] ABSTRACT

A seat adjustment device for a vehicle seat which includes two lock mechanisms respectively provided in a pair of rail assemblies. One of the lock mechanisms may be a fine-pitched lock mechanism provided in either of the rail assemblies, or both of the lock mechanisms may each be fine-pitched lock mechanism respectively mounted in both of the rail assemblies. The fine-pitched lock mechanism comprises a lock plate with a tooth-formed portion provided in one of the rail assemblies and a link provided in the other rail assembly and having a tooth body to be intermeshed with the tooth-formed portion of the lock plate by means of a toggle action.

7 Claims, 3 Drawing Figures

SEAT ADJUSTMENT DEVICE FOR A VEHICLE SEAT

BACKGROUND OF THE INVENTION

1. Field of the Invention

The present invention relates to a seat adjustment device for adjusting the front and rear positions of seats used in vehicles and, in particular, to an improved seat adjustment device including dual locking mechanisms, that is a dual-side locking type adjustment device.

2. Description of the Prior Art

A conventional seat adjustment device typically comprises a pair of rail assemblies such that each assembly includes a fixed-side rail adapted to be fixed to the floor of a vehicle body and a movable-side rail adapted to be mounted to a seat. Two two rails are thus engaged with each other so that one rail is slidable relative to the other rail. Conventional seat adjustment device can be classified into two types. One type is referred to as a single-side locking type in which a lock mechanism for locking the fixed-side and movable-side rails is provided only in one of the two assemblies. The other type is called a dual-side locking type in which there are provided dual lock mechanisms in both of the assemblies respectively. In the single-side locking system, since both rails of the other rail assembly are free to slide relative to each other, in case of sudden stops or the like, pushing forces may be biased onto the seat to deform a seat frame and thus it is necessary to increase the rigidity of the seat frame by attaching a reinforcement member thereto or by other suitable means. A seat employing this type of adjustment device is thus increased in weight and also becomes more expensive. For these reasons as well (as from the viewpoint of safety), the dual-side locking system has been employed increasingly in these years. In the both-side locking system employed in the seat adjustment device, however, both lock mechanisms for the respective rail assemblies must perform their respective locking/unlocking operations cooperatively and simultaneously with each other, which requires components of higher precision.

Specifically, the lock mechanism provided in the above both-side locking system is constructed such that engagement bores are formed at required intervals in the fixed-side rail in the longitudinal direction thereof. A lock plate provided with corresponding click pieces to be engaged into the engagement is mounted to the movable-side rail wherein the lock plate is movably operated to engage the click pieces into the engagement bores and disengage the former out of the latter. In such a manner, the movable-side rail can be locked and unlocked relative to the fixed-side rail. In the case of the dual-side locking system, such locking and unlocking operations of both lower rails must be carried out simultaneously, and the lock mechanisms require more accurately formed engagement bores in the fixed-side rail, lock plate and seat frame, as well as more time and labor for positioning them during assembly.

SUMMARY OF THE INVENTION

Accordingly, in view of the above mentioned drawbacks in the prior art seat adjustment device, it is a principal object of the present invention to reduce the weight and improve the safety of a seat adjustment device for adjusting the forward and rearward movement of seats used in vehicles.

In order to attain the above object, according to the invention, there is provided an improved seat adjustment device in which a stepped lock mechanism is provided between the rails of one rail assembly, a fine pitched lock mechanism is provided between the rails of the other rail assembly wherein these two lock mechanisms are cooperatively connected with each other.

According to this improved structure, even when small positional differences may occur between the two rail assemblies, the stepped lock mechanism can be operated into its locked state, causing the stepless lock mechanism to be locked as well. Thus, both of the stepped and stepless lock mechanisms can be locked simultaneously so as to cooperate to carry loads applied onto the seat, which eliminates the need for any reinforcing means for increasing the rigidity of the seat adjustment device as in the prior art. Therefore, according to the invention, the weight of the entire seat adjustment device can be reduced as compared to the conventional seat adjustment device.

Also, according to a preferred embodiment of the invention, the engagement provided between the tooth-formed portion of a lock plate and a tooth body in the fine pitched lock mechanism is maintained by means of a toggle action of the tooth body, so that a better locking relationship is obtained and undesired play is prevented between the lock mechanisms. Thus, the engagement by such toggle action is effective for safety purposes.

It is another object of the present invention to provide a seat adjustment device in which both of the lock mechanisms can be easily assembled for enhanced operability and in which reasonable accuracy is obtained during manufacture.

In order to achieve this object, there is provided a fine pitched lock mechanism and, in one of the rail assemblies, a lock plate having a tooth-formed portion. The other rail assembly includes a link with a tooth body adapted to be engaged with the lock plate. The tooth-formed portion of the lock plate and the tooth body of the link are intermeshed with each other by means of toggle action. This toggle action also serves to maintain this intermeshed relationship.

Each of the rail assemblies comprises a fixed-side rail fixedly secured to the floor of a vehicle body and a movable-side rail mounted to the underside of a seat cushion, with both of the fixed-side and movable-side rails being slidably connected with each other.

On the other hand, in the stepped lock mechanism, a plurality of engagement bores are formed at equal intervals longitudinally on the inside surface of the fixed-side rails, and a lock plate with click pieces to be engaged into said engagement bores in the fixed-side rail is rotatably mounted to the movable-side rail by means of a shaft pin, whereby the locking of the stepped lock mechanism can be released by rotating a lever with a handle having its botton end fixed to the lock plate.

Further, in order to simplify assembly and manufacturing of components, according to another embodiment of the present invention, both of the right and left rail assemblies may be provided with their respective fine pitched lock mechanisms which may be cooperatively connected with each other by means of a connecting member.

Moreover, a seat back may be connected with the lock plate in the one lock mechanism by means of a wire. In this connection system, if the seat back is leaned forward, then the locking is released so that the seat cushion is free to move forwardly and rearwardly.

BRIEF DESCRIPTION OF THE DRAWINGS

The invention is explained with reference to the drawings illustrating a preferred embodiment of the present invention.

DETAILED DESCRIPTION OF A PREFERRED EMBODIMENT OF THE INVENTION

Figure 1:
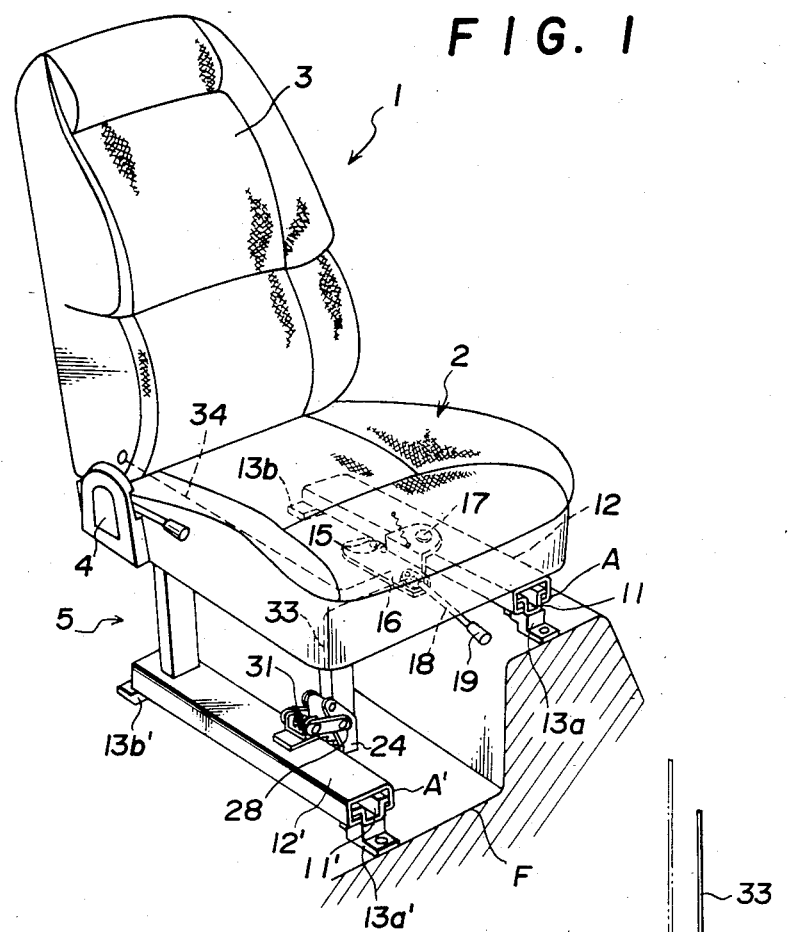
FIG. 1 is a perspective view of a seat employing a seat adjustment device constructed in accordance with the present invention.

Referring to FIG. 1, (1) designates generally a seat for vehicles which comprises a seat cushion (2) and a seat back (3) being connected with each other by means of a cantilever reclining device (4). A seat adjustment device (5) constructed in accordance with the present invention is mounted to the underside of the seat cushion (2).

Figure 3:
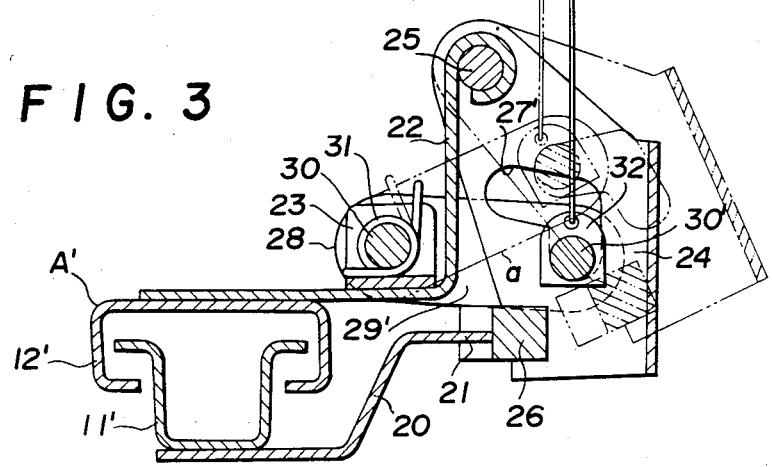
Figure 2:
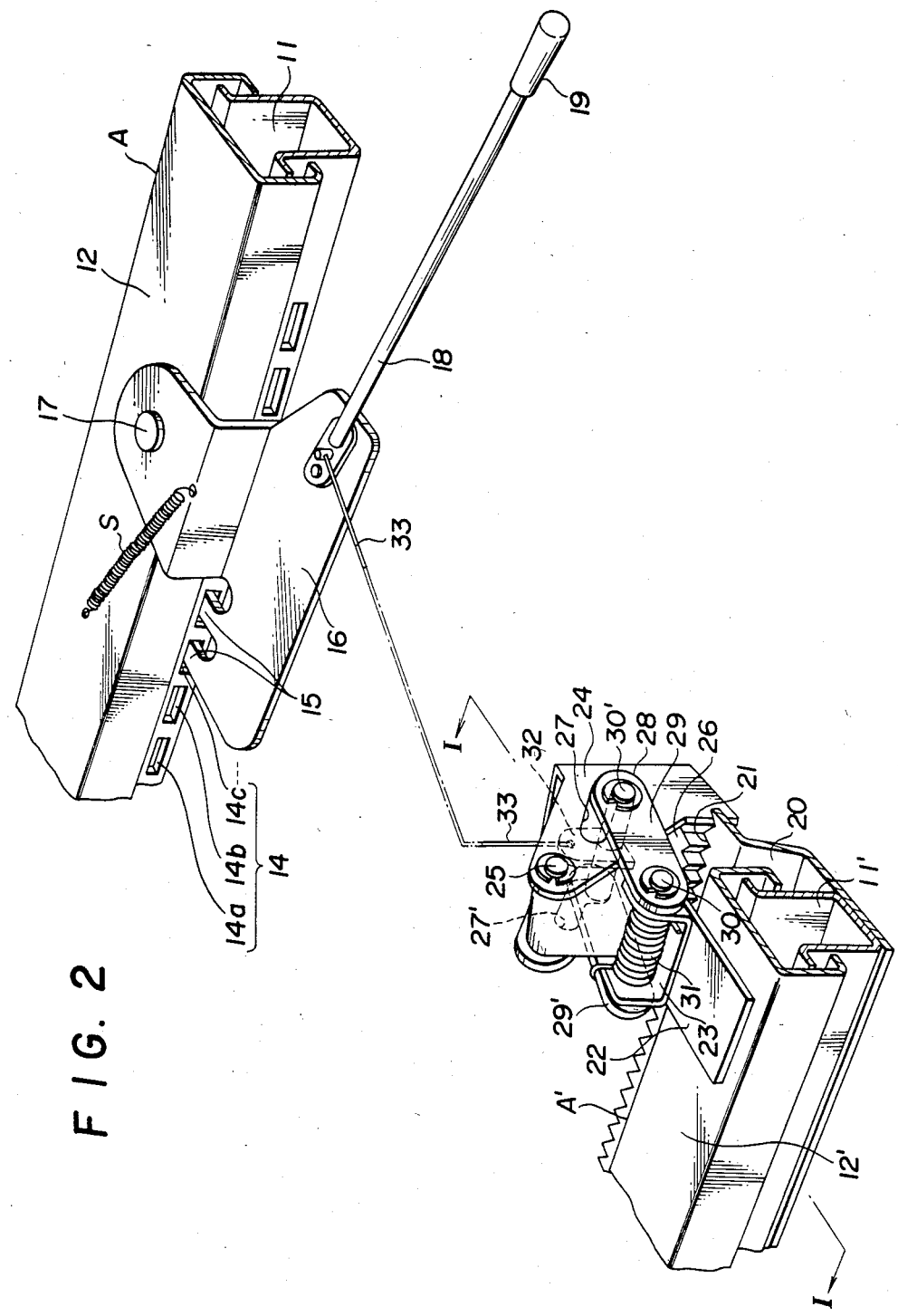
FIG. 2 is a perspective view of a portion of an embodiment of the present invention; and, FIG. 3 is an enlarged section view taken along a line I—I in FIG. 2.

The seat adjustment device will be described now with reference to FIGS. 2 and 3. In the drawings, (11) (11') represent fixed-side rails to be fixed to a vehicle floor (F) respectively and (12) (12') denote movable-side rails to be mounted to the underside of the seat cushion (2) respectively, with the fixed-side rails (11) (11') having legs (13a)(13b),(13a')(13b') fixed to the underside both ends thereof respectively. The fixed-side rails (11)(11') and movable-side rails (12)(12') are telescopically and slidably connected with each other to form rail assemblies A, A', respectively.

In the inner side surface of the fixed-side rail (11) of one rail assembly (A) there are formed a plurality of engagement bores (14) (14a, 14b, 14c—) equally spaced longitudinally, while to the movableside rail (12) is mounted a lock plate (16) provided with click pieces (15) adapted to be engaged into the engagement bores (14) by means of a shaft pin (17), to which lock plate (16) is fixedly secured the bottom end of a lever (18) being projected toward the front surface side of the seat cushion (2). When this lever (18) is pivoted by means of manual operation of a handle (19), the lock plate (16) is rotated to disengage the click pieces (15) out of the associated engagement bores (14) so as to release the locking engagement therebetween. In this way, in one rail assembly (A), a stepped lock mechanism is formed.

On the other hand, along the inner side surface of the fixed-side rail (11') of the other rail assembly A' there is fixed a lock plate (20) provided with a longitudinally extending tooth-formed portion (21) at its inner edge. To the movable-side rail (12') is fixed a plate stay (22), to which is fixedly secured a bracket (23) of a U-shaped configuration. To the upper end of the rising portion of the plate stay (22) there is mounted a link (24) with U-shaped section by means of a shaft pin (25) so as to be pivotal about an axis defined by the latter. The lower portion of link (24) includes a tooth body (26) capable of intermeshed relationship with the tooth-formed portion (21) of the lock plate (20). Both side surfaces of which link (24) define inverted-L-shaped guide holes (27)(27'), respectively. There is also provided a link (28) having one of its ends journalled to the bracket (23), while the other end is engaged with the link (24).

Specifically, the link (28) is formed by extending shaft pins (30)(30') between both ends of a pair of plates (29)(29'), with both plates (29)(29') being disposed at both sides of bracket (23) and link (24). The shaft pin (30) at one end of plates (29), (29') is journalled to the bracket (23), while the shaft pin (30') at the other end of plates (29)(29') is engaged within the guide holes (27)(27') of the link (24). The shaft pin (30) is wound by a coil spring (31) such that one end of the coil spring (31) is secured to the bracket and the other end to one plate (29') respectively. The link (28) is normally rotated about the shaft pin (30) and thus normally biased downwardly, causing the shaft pin (30') to be engaged into the lower portions of the guide holes (27)(27') of the link (24). With this condition maintained, the link (24) is downwardly rotated to be positioned in such a manner that the tooth body (26) is intermeshed with the tooth-formed portion (21) of the lock plate (20). While the tooth-formed portion (21) of the lock plate (20) is intermeshed with the tooth body (26), the lower half sections of the guide holes (27)(27') of the link (24) into which the shaft pin (30') is engaged are located substantially at right angles to a center line (a) connecting the centers of the shaft pins (30)(30') of the link (28) to form a toggle mechanism, which serves to maintain the intermeshing relationship between the tooth-formed portion (21) and the tooth body (26). A cable mounting plate (32) is also fixed to the central portion of the shaft pin (30') to be engaged into the guide holes (27)(27') of the link (24). In this manner, a fine-pitched lock mechanism is formed in the other rail assembly A'.

In the lock mechanisms thus arranged in both rail assemblies A A', the lock plate (16) in the rail assembly A is linked to the cable mounting plate (32) fixed to the link (28) in the rail assembly A' by means of a cable (33), so that both of the two lock mechanism are cooperatively connected with each other.

The operation of the seat adjustment device constructed in the above mentioned manner will now be described.

In a non-operational state, with reference to rail assembly A, the click piece (15) of the lock plate (16) mounted to the movable-side rail (12) are engaged into their mating engagement bores (14) of the fixed-side rail (11) and the movable-side rail (12) is locked relative to the fixed-side rail (11). On the other hand, on the side of the other rail assembly A', the tooth body (26) fixed to the link (24) which is mounted to the movable-side rail (12') by means of the plate stay (22) is intermeshed with the tooth-formed portion (21) of the lock plate (20) fixed to the fixed-side rail (11'). This intermeshing relationship is maintained by means of rotative biasing of the link (24) by the link and the movable-side rail (12') thus locked relative to the fixed-side rail (11'). In this state therefore, the seat (1) is fixedly secured to the vehicle body floor F.

In order to adjust the forward and rearward positions of the seat (1), the lever (18) is rotated by means of manual manipulation the handle (19) so as to responsively rotate the lock plate (16). In such a manner, the click pieces (15) are disengaged from the engagement bores (14) formed in the fixed-side rail (11) thereby releasing the locking of the movable-side rail (12) on the one rail assembly A. The rotation of the lock plate (16) also simultaneously pulls in the cable (33) which responsively causes the link (28) of the other lock mechanism to be rotated upwardly against the biasing forces of the coil spring (31). The shaft pin (30') is, in turn caused to move past the lower half sections of the guide holes (27) (27') formed in the link (24) and then to abut against the upper half bent sections thereof. In this state, the link (24) is rotated upwardly about the shaft pin (25) with the upward rotation of the link (28) and the tooth body (26) thereby being disengaged from the tooth-formed portion (21) of the lock plate (20) so that the locking relationship of the movable-side rail (12') relative to the fixed-side rail (11') is released. After the locking conditions of the movableside rails (12)(12') in the rail assemblies A A' have been released in this manner, the movable-side rails (12)(12') are capable of sliding relative to the fixed-side rails (11), respectively so as to move the seat (1) forwardly and rearwardly.

When the lever (18) is released at a desired movement position of the seat (1), the lock plate (16) on the side of the one rail assembly A is rotated back by means of a return spring S so that the click pieces (15) are engaged into their corresponding engagement bores (14), while the link (28) provided on the side of the other rail assembly A' is rotated downwardly by means of the biasing forces of the coil spring (31) due to the release of the pulling force by the cable (33). The link (24) is thus pushed by the shaft pin (30') of the link (28) so as to be rotated downwardly, so that the tooth body (26) is again meshed with the tooth-formed portion (21) of the lock plate (20). In this manner, the movableside rails (12)(12') are again locked relative to the fixed-side rails (11)(11') respectively, so that the seat (1) can be fixedly secured at its newly adjusted position.

During operation, the link (24) is pushed with the biasing forces of the coil spring (31) by the link (28) and the toggle action causes the tooth body (26) to be intermeshed with the tooth-formed portion (21) of the lock plate (20). Therefore, such intermeshing relationship can be positively maintained.

Also, the lock plate (16) may be connected with the seat back (3) by means of a cable (34) and thus it may be rotatively operated in association with the forward inclination movement of the seat back (3), so that the locking of the movable-side rails (12)(12') can be released as the seat back (3) is caused to incline forwardly.

Accordingly, in the preferred embodiment of the invention, on the side of the one rail assembly A the engagement of the click pieces (15) of the lock plate (16) into the engagement bores (14) permits a stepped locking of the movable-side rail (12) relative to the fixed-side rail (11), while on the side of the other rail assembly A' a fine-pitched locking of the movable-side rail (12') relative to the fixed-side rail (11') can be achieved by means of the intermeshing of the tooth body (26) fixed to the link (24) with the tooth-formed portion (21) of the lock plate (20).

Although in the illustrated embodiment of the invention a well known stepped lock mechanism is provided on the side of the one rail assembly A and a stepless lock mechanism constructed in accordance with the invention is employed on the other rail assembly A' side, it should be understood that the stepless lock mechanism of the invention may also be provided in the one rail assembly A, or that the stepless lock mechanism of the invention can be mounted in either of the two rail assemblies so as to form a one-side lock mechanism.

As it is clear from the foregoing description, the invention provides an improved seat adjustment device in which one of the rail assemblies is provided with a stepped lock mechanism, the other rail assembly is provided with a fine-pitched lock mechanism adapted to intermesh the tooth-formed portion of a lock plate with a tooth body provided in a link by means of toggle action. The two lock mechanisms are cooperatively connected with each other by means of a linkage member, whereby, even when some positional differences occur between both rail assemblies the fine pitched lock mechanism can be locked with the stepped lock mechanism, and thus both of the rail assemblies can be locked simultaneously so that the seat can be fixed and maintained positively. Since the intermeshing relationship between the tooth-formed portion and the tooth body on the side of the fine-pitched lock mechanism is maintained by means of the toggle action of the tooth body, they will never be disengaged unnecessarily when any shock is applied to said rail assemblies. Thus, the toggle action provided by way of the present invention is also useful as a safety measure because it can prevent the occurrence of play. Also, according to the invention, during manufacturing, both of the lock mechanisms respectively provided in the rail assemblies can be positioned without sacrificing accuracy and the assembling steps can be simplified for an enhanced operating efficiency, resulting in great practical effects.

What is claimed is:

1. A seat adjustment device for seats used in vehicles of the type including a pair of rail assemblies, each rail assembly formed by slidably combining a fixed-side rail fixed to the floor of the vehicle and a movable-side rail mounted to the seat, said seat adjustment device comprising:
    a stepped lock mechanism provided in one of said pair of rail assemblies,
    a fine-pitched lock mechanism provided in the other of said pair of rail assemblies, and
    connecting means for cooperatively connecting said stepped and fine-pitched lock mechanisms with each other, wherein
    said fine-pitched lock mechanism includes (a) a lock plate having a toothed portion rigidly associated with said other rail assembly, (b) a link including a toothed body adapted to be intermeshed with said toothed portion of said lock plate, wherein said toothed portion of said lock plate and said toothed body are intermeshed with one another by means for providing a toggle action.

2. The seat adjustment device as in claim 1, wherein said stepped lock mechanism comprises a plurality of equally spaced engagement bores defined in said one rail assembly and a lock plate including click pieces adapted to be received in respective ones of said plurality of engagement bores.

3. The seat adjustment device as in claim 1, further comprising lever means which projects towards a front side of a seat cushion, and wherein manual operation of said lever means responsively unlocks said said fine-pitched lock mechanism.

4. The seat adjustment device as in claim 1, further comprising cable means for interconnecting said lock plate of said fine-pitched lock mechanism with a seat back, said cable means for unlocking said fine-pitched lock mechanism in response to forward inclination of said seat back.

5. A vehicle seat of the type having a pair of spaced-apart rail assemblies each including a slidably coupled pair of slide rails having a fixed-position slide rail and a movable side rail, said pair of rail assemblies for permitting the vehicle seat to be slidably moved between forward and rearward positions, and locking means associated with at least one of said rail assemblies for locking said fixed-position and movable slide rails one to another to thereby prevent slidable movement of said seat, said locking means comprising:

a toothed rack rigidly associated with said fixed-position slide rail;

a lock plate including a toothed portion, said lock plate pivotally mounted to said movable slide rail so as to be pivotal between (a) a locked position wherein said toothed portion is intermeshed with said toothed rack to thus prevent said slidable seat movement, and (b) an unlocked position wherein said toothed portion is spaced from said toothed rack to thereby permit said slidable seat movement;

said lock plate also including means defining an inverted L-shaped guide slot having upper and lower portions;

a link member having one end pivotally connected to said movable slide rail and another end slidably received within said guide slot; and lever means operatively connected to said link member for exerting a pull force on said another end thereof when said lever means is manually operated, said lever means for causing said another end to be slidably moved within said guide slot from said lower portion to said upper portion thereof by virture of said pull force which, in turn, responsively pivots said lock plate from said locked position and into said unlocked position.

6. A vehicle seat as in claim 5 wherein said link member includes biasing means for biasing said another end into said lower portion of said guide slot.

7. A vehicle seat as in claim 5 of the type further including a seat back pivotally connected to a seat cushion, said locking means further including means for moving said lock plate into said unlocked position in response to said seat back being pivotally inclined relative to said seat cushion.

* * * * *